(12) United States Patent
Wu et al.

(10) Patent No.: US 9,854,630 B1
(45) Date of Patent: Dec. 26, 2017

(54) FLICKER-FREE DIMMING CIRCUIT FOR NON-POINT LIGHT SOURCE

(71) Applicant: UNITY OPTO TECHNOLOGY CO., LTD., New Taipei (TW)

(72) Inventors: Chih-Hsien Wu, New Taipei (TW); Kai-Cheng Chuang, New Taipei (TW); Cheng-Han Hung, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 15/427,274

(22) Filed: Feb. 8, 2017

(30) Foreign Application Priority Data

Dec. 5, 2016 (TW) .............................. 105140045 A

(51) Int. Cl.
| | | |
|---|---|---|
| *H05B 37/02* | (2006.01) | |
| *H05B 33/08* | (2006.01) | |
| *H02M 3/335* | (2006.01) | |
| *H02M 1/08* | (2006.01) | |

(52) U.S. Cl.
CPC ........ *H05B 33/0818* (2013.01); *H02M 1/081* (2013.01); *H02M 3/33523* (2013.01); *H05B 33/0851* (2013.01); *H05B 33/0815* (2013.01)

(58) Field of Classification Search
CPC .................................. H05B 33/0815
USPC ..................... 315/209 R, 219, 291, 307, 308
See application file for complete search history.

(56) References Cited

U.S. PATENT DOCUMENTS

| | | | | |
|---|---|---|---|---|
| 8,937,435 B1* | 1/2015 | Sutardja | ............. | H05B 33/0815 315/219 |
| 9,392,654 B2* | 7/2016 | Peng | .................. | H05B 33/0815 |
| 2014/0285092 A1* | 9/2014 | Knoedgen | .......... | H05B 37/0272 315/151 |

* cited by examiner

*Primary Examiner* — Thuy Vinh Tran
(74) *Attorney, Agent, or Firm* — Rosenberg, Klein & Lee

(57) ABSTRACT

A flicker-free dimming circuit for non-point light source has a TRIAC module, an input module, a conversion module and an output module. The TRIAC module adjusts the voltage phase of an external power supply for the input module to export an input voltage, and the conversion module in a boost circuit structure is provided with a conversion coil and a converter to receive and raise the voltage value of the input voltage to a voltage value of an operating voltage and then supplies the operating voltage to the output module. The output module adopts a fly-back circuit structure and induces the operating voltage to form a driving voltage in a constant value and then outputs the driving voltage to a lamp with a relatively wide light source area. In this way, the panel lamp can meet high safety standards and enhance its product adaptability and competiveness.

3 Claims, 6 Drawing Sheets

FLICKER-FREE DIMMING CIRCUIT FOR NON-POINT LIGHT SOURCE

CROSS-REFERENCE TO RELATED APPLICATIONS

This non-provisional application claims priority under 35 U.S.C. §119(a) on Patent Application No(s). 105140045 filed in Taiwan, R.O.C. on Dec. 5, 2016, the entire contents of which are hereby incorporated by reference.

FIELD OF THE INVENTION

The present invention generally relates to the field of power conversion device, particularly to a flicker-free dimming circuit for a non-point light source that supports a TRI-electrode AC switch (TRIAC).

BACKGROUND OF THE INVENTION

1. Description of the Related Art

To create a comfortable, bright, and stylish space for reading or work, many people install simple and elegant panel lamps at indoor ceilings. Of course, a driving circuit for converting the mains power is required for driving the light source components of the panel lamps, supplying electric power required by the operation of the light source components and stabilizing the overall work quality of the lamps. With reference to FIG. 1 for a conventional driving circuit 1, the driving circuit 1 is generally used in a conventional 15.7 W panel lamp that generally adopts a non-isolated boost power converter, and the driving circuit 1 comprises an inductor (L), a diode (D), a capacitor (C), a switch 10, a detection resistor (RS) and a PWM controller 11, wherein the inductor is connected to an anode of the diode in series and coupled to a drain of the switch 10, and the PWM controller 11 is coupled to a gate and a source of the switch 10, and the detection resistor, and a cathode of the diode is coupled to the capacitor and then electrically coupled to at least one LED 12. The inductor receives an input voltage ($V_{in}$) and stores energy when the switch 10 is electrically conducted. When the switch 10 is cut off, the capacitor is used to filter the energy stored by the inductor to form and output a driving voltage ($V_{out}$) or a driving current ($I_{out}$). The simple, and low-cost driving circuit 1 has the boosting effect and drives the LED 12 to emit light under a low-voltage power supply circuit structure. However, the driving circuit 1 is a non-isolated circuit with a very low effect on a precise constant current, and thus causing an issue on safety regulations and an issue on Electromagnetic Compatibility (EMC) and failing to meet the dimming requirement of the present panel lamps. In addition, the panel lamp or down light has a relatively wide light source area and is lamp with a non-point light source. If the output current of the driving circuit 1 is not constant, the lamp will have an obviously flicker that affects the lighting quality (as ordinary persons having ordinary skill knows about it very well).

On the other hand, the self-excited power conversion circuit 9 having an isolated circuit structure and generally used in the conventional incandescent or halogen lamps does not have the aforementioned problem, since a half-bridge resonant circuit is adopted to achieve the direct conversion effect and has the features of quick-start, flicker-free, and universal use in large and small power circuits and the advantages of simple structure and low cost. Although the self-excited driving circuit has a simple structure, it lacks of a constant power control mechanism. The output power usually rises with the input voltage, and thus the lamp cannot maintain a stable brightness which causes a quick ageing of the lamp.

In view of the aforementioned drawbacks of the conventional driving circuit, it is an important subject of the present invention to integrate the foregoing isolated circuit structure with the conventional LED panel lamp that generally adopts a non-isolated circuit structure to achieve the effect of preventing flickers in the application of the lamp having a relatively wide light source area and a TRIAC dimming function, so as to meet the requirements of safety regulations, improving the product adaptability, and promote the industrial production.

2. Summary of the Invention

Therefore, it is a primary objective of the present invention to overcome the drawbacks of the prior art by providing a flicker-free dimming circuit for a non-point light source for a commercial panel lamp or down light with a wide light source area, and allowing consumers to adjust the illumination brightness as needed and achieve the effect of preventing flickers and providing a high lighting quality.

To achieve the aforementioned and other objectives, the present invention discloses a flicker-free dimming circuit for a non-point light source comprising an input module, a conversion module and an output module, and the input module being electrically coupled to an external power supply and provided for outputting an input voltage, and the conversion module being electrically coupled to the input module and the output module and provided for outputting an operating voltage to the output module after receiving the input current, and the output module outputting a driving voltage to drive at least one lamp with a wide light source area to operate, characterized in that the flicker-free dimming circuit for a non-point light source comprises a TRIAC module for regulating a conduction phase angle of the input voltage, and the conversion module adopts a boost circuit structure and has a conversion coil and a converter, and the conversion coil and the converter are provided for increasing the voltage value of the input voltage to the voltage value of the operating voltage, and the output module adopts a fly-back circuit structure and has a control coil module and a regulator, and the control coil module is provided for sensing the operating voltage to form the driving voltage while the regulator regulates a working period of the driving voltage to achieve a constant voltage value.

Wherein, the operating voltage has a voltage value of 220 volts.

In addition, the converter has a sensing coil, a first core, a conversion chip, and a conversion switch, and the conversion coil is installed at a primary side of the first core, and the sensing coil is installed at a secondary side of the first core and electrically coupled to the conversion chip, and the conversion switch is electrically coupled to the conversion chip and the conversion coil, and when the conversion coil transmits the input voltage, the sensing coil senses a sensing voltage by the first core, and the sensing voltage is provided for the conversion chip to reference and then regulate the working period of the conversion switch to maintain the voltage value of the input voltage constant. The control coil module comprises a primary side coil, a second core, a secondary side coil and a regulation coil, and the primary side coil and the regulation coil are installed at a primary side of the second core, and the secondary side coil is installed at a secondary side of the second core, and the regulator is electrically coupled to the primary side coil and the regulation coil, and the primary side coil is electrically coupled to the conversion module for receiving the operating voltage, and the secondary side coil forms the driving voltage through the second core magnetic induction while the regulation coil forms a regulation signal through the second core magnetic induction, and the regulation signal is provided for the regulator to regulate the working period of the primary side coil. The regulator has a regulation chip, a regulation switch, and a detection element, and the detection element is electrically coupled to the regulation coil and the regulation chip, and the regulation switch is electrically coupled to the regulation chip and the primary side coil, and when a regulation voltage is obtained from the operating voltage of the magnetic induction of the regulation coil, the detection element detects and forms a regulation signal and feeds back the regulation signal to the regulation chip, so that the regulation chip regulates the working period of the regulation switch to regulate the cycle time of the operating voltage received by the primary side coil, so as to achieve a constant voltage effect.

In summation, the present invention bases on reverse thinking to apply a conventional two-stage isolated power conversion circuit in the LED lamp with a wide light source area and uses a primary side boost circuit to raise the voltage value of the input voltage to a constant and then uses a primary side regulation (PSR) Fly-back circuit provide a constant output of the driving voltage to reduce the amplitude of ripples effectively, achieve the flicker-free lighting effect, and comply with the expectation of the international industrial economic development.

DESCRIPTION OF THE PREFERRED EMBODIMENTS

The above and other objects, features and advantages of this disclosure will become apparent from the following detailed description taken with the accompanying drawings.

Figure 1:
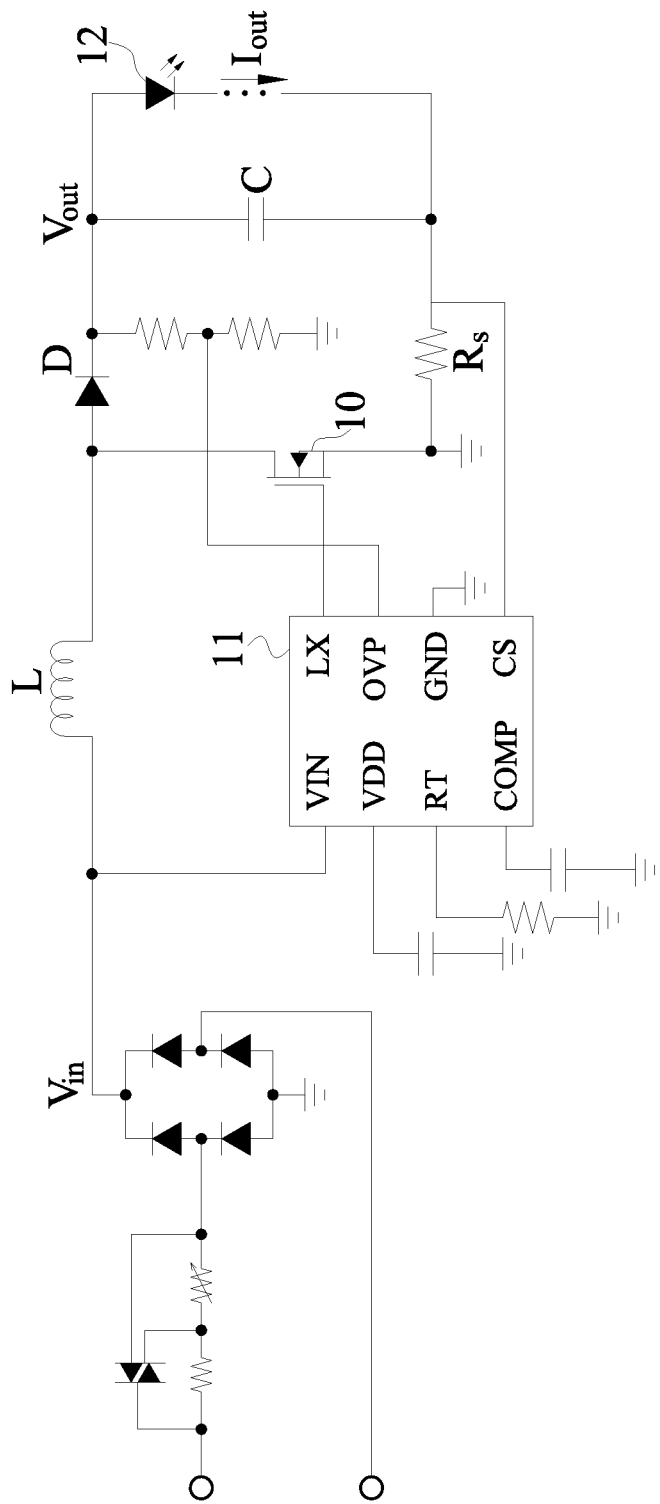
FIG. 1 is a circuit diagram of a conventional non-isolated driving circuit.
Figure 2:
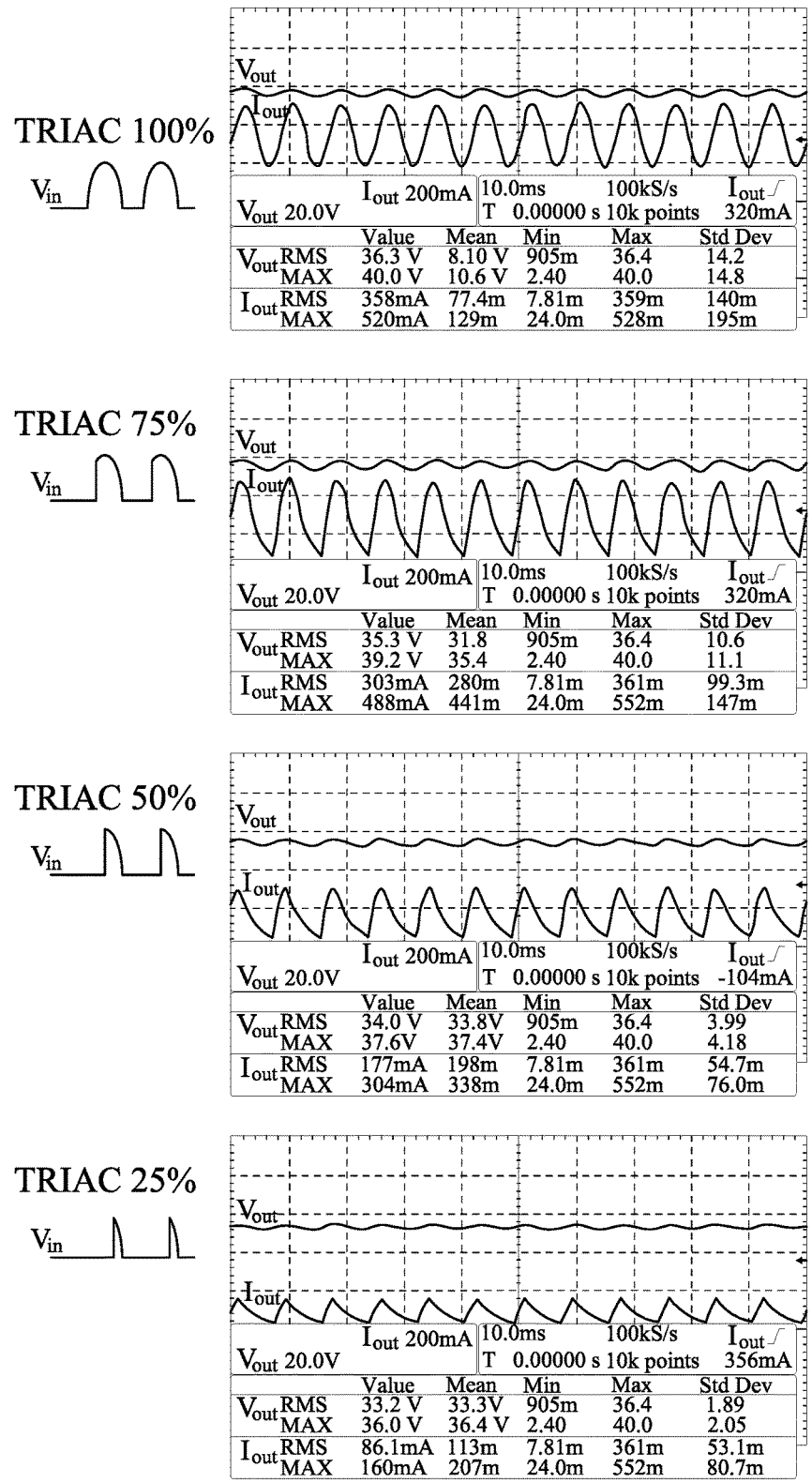
FIG. 2 is a waveform chart of a conventional non-isolated driving circuit.
Figure 3:
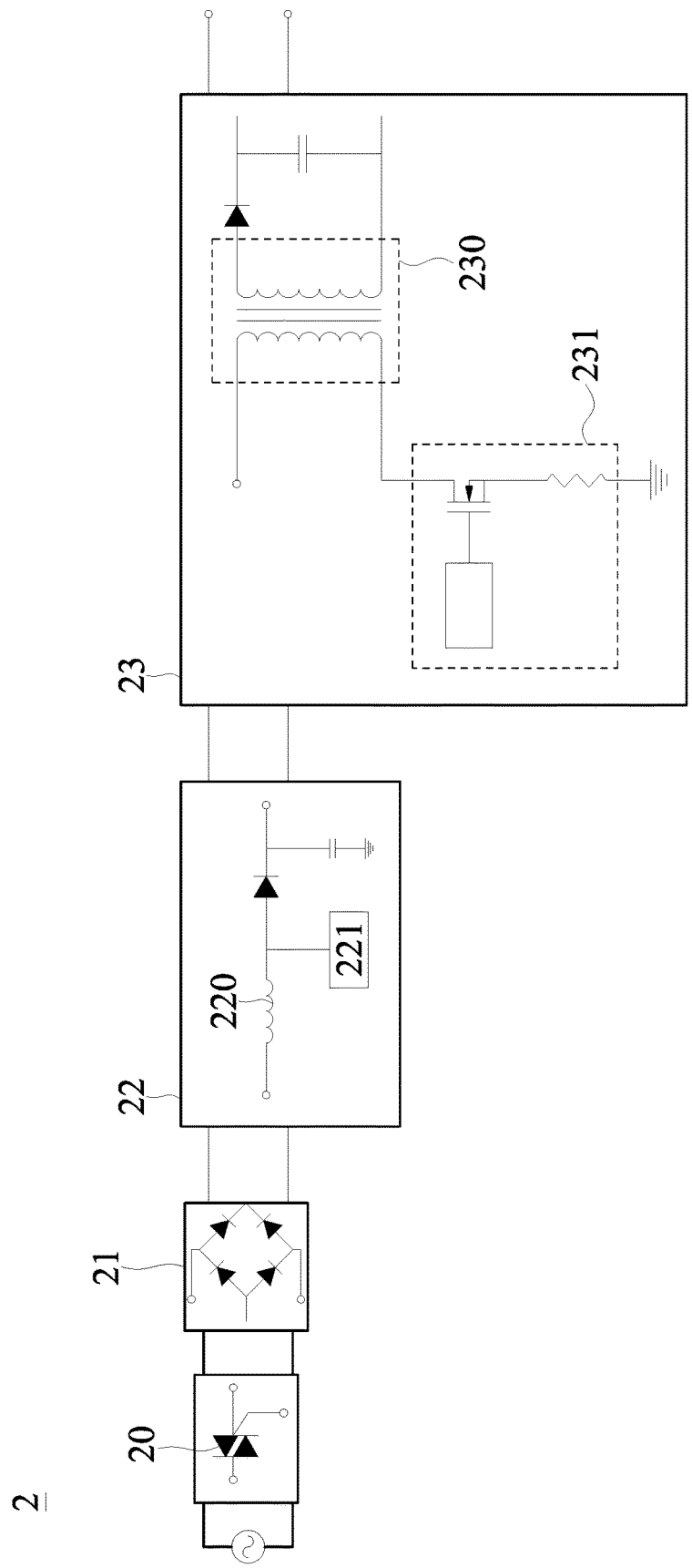
FIG. 3 is a block diagram of a preferred embodiment of the present invention.
Figure 4A:
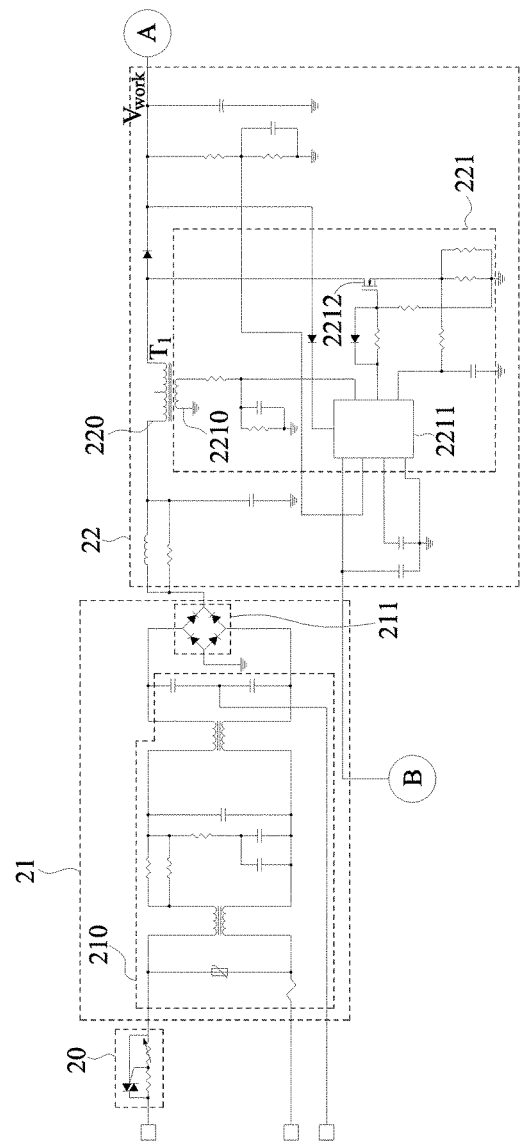
FIGS. 4A and 4B are circuit diagrams of a preferred embodiment of the present invention.
Figure 4B:
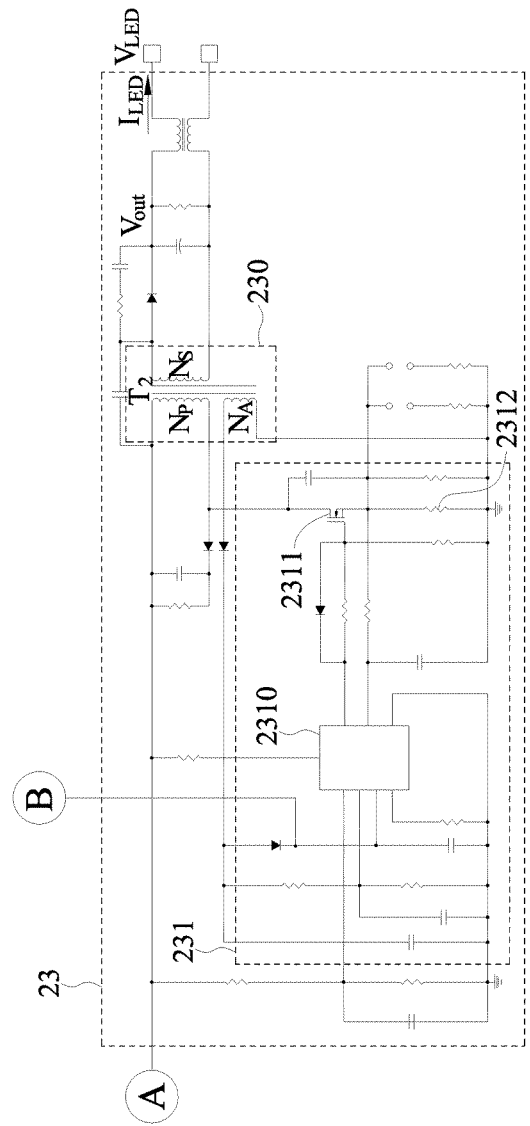
Figure 5:
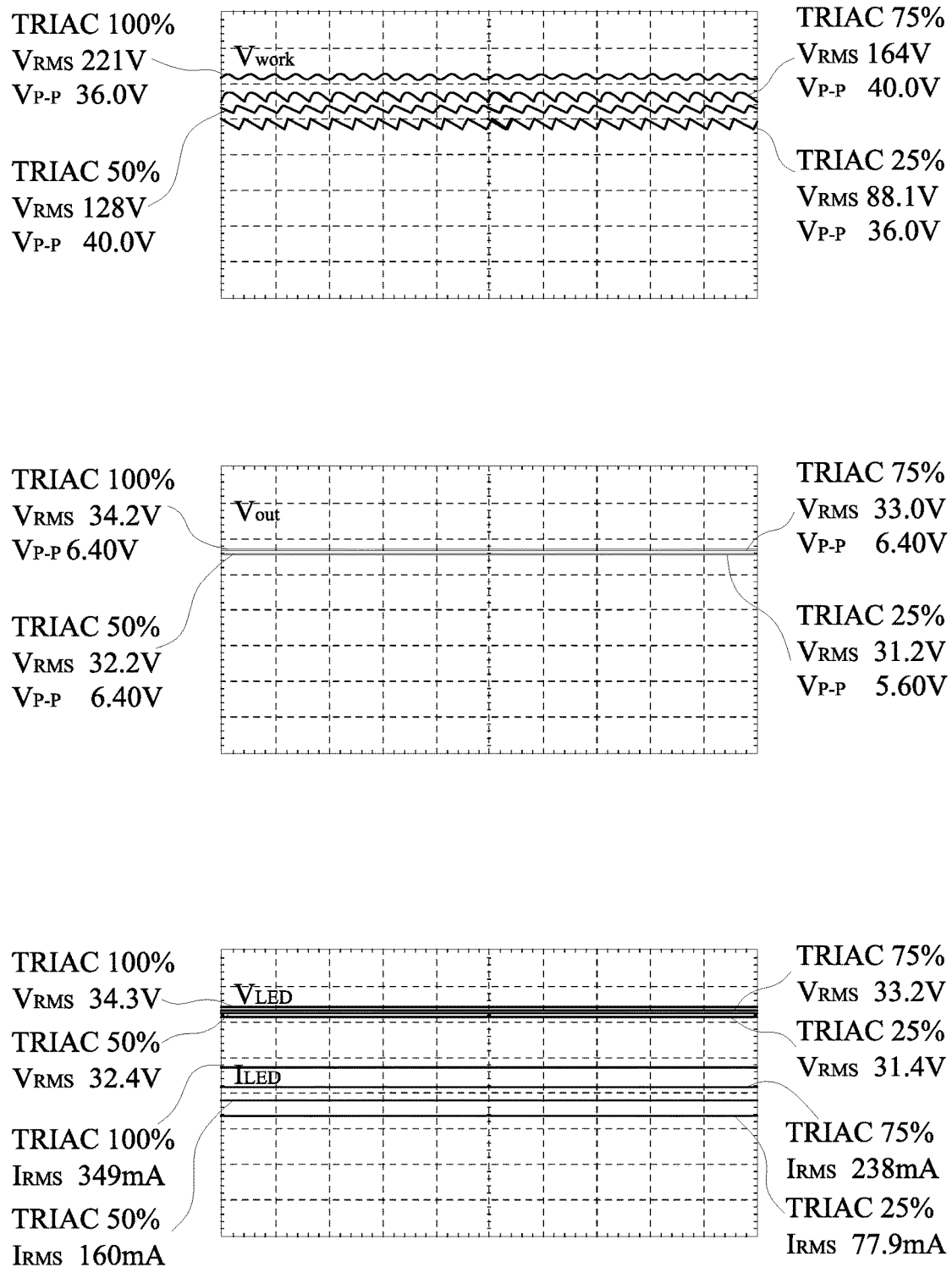
FIG. 5 is a waveform chart of a preferred embodiment of the present invention.

With reference to FIGS. 3 to 5 for a block diagram, a circuit diagram and a waveform chart of a preferred embodiment of the present invention respectively, the 15.7 W flicker-free dimming circuit for a non-point light source 2 adopt a two-stage isolated circuit structure to drive the operation of a lamp having a wide light source area and allow users to adjust the brightness of the lamp as needed while achieving the effects of providing a flicker free lighting effect and complying with the high-quality consumer requirements. The flicker-free dimming circuit for a non-point light source 2 comprises a TRIAC module 20, an input module 21, a conversion module 22 and an output module 23, and the input module 21 receives an AC voltage, and the TRIAC module 20 is electrically coupled to an external power supply (not shown in the figure), and the conversion module 22 is electrically coupled to the input module 21 and the output module 23, and the output module 23 is electrically coupled to a plurality of LEDs (not shown in the figure) of the lamp. The input module 21 has an EMC device 210 and a bridge rectifier 211, and the conversion module 22 adopts a boost circuit structure and has a conversion coil 220 and a converter 221, and the converter 221 has a sensing coil 2210, a first core (T1), a conversion chip 2211 and a conversion switch 2212. In addition, the output module 23 adopts a PSR fly-back circuit structure and has a control coil module 230 and a regulator 231, and the control coil module 230 comprises a primary side coil (NP), a second core (T2), a secondary side coil (NS) and a regulation coil (NA), and the regulator 231 has a regulation chip 2310, a regulation switch 2311, and a detection element 2312.

The TRIAC module 20 has a terminal electrically coupled to the external power supply and the other terminal electrically coupled to the bridge rectifier 211 through the EMC device 210, and the bridge rectifier 211 is electrically coupled to the conversion coil 220, so that after the TRIAC module 20 receives and adjusts a conduction phase angle of an AC voltage of the external power supply, the conduction phase angle is provided to the bridge rectifier 211 to rectify and form an input voltage and output the input voltage to the conversion coil 220.

The primary side and the secondary side of the first core have the conversion coil 220 and the sensing coil 2210 respectively, and the sensing coil 2210 is electrically coupled to the conversion chip 2211, and the conversion switch 2212 is electrically coupled to the conversion chip 2211 and the conversion coil 220. When the conversion coil 220 receives the input voltage, an electric discharge is performed to increase the voltage value of the input voltage to the voltage value of an operating voltage ($V_{work}$). In the meantime, the sensing coil 2210 senses and forms a sensing voltage through the first core. After the sensing voltage is provided for the conversion chip 2211 to reference, the working period of the conversion switch 2212 is regulated, and the voltage value of the input voltage is maintained to a constant of the operating voltage such as 220V.

The primary side coil and the regulation coil are installed at a primary side of the second core, and the secondary side coil is installed at a secondary side of the second core, and the primary side coil is electrically coupled to the conversion coil 220, and the secondary side coil is electrically coupled to the LEDs, and the regulation chip 2310 is electrically coupled to the primary side coil and the regulation coil, and the detection element 2312 is electrically coupled to the regulation switch 2311, and the regulation switch 2311 is electrically coupled to the primary side coil. After the primary side coil receives the operating voltage, the secondary side coil forms a driving voltage ($V_{out}$) through the magnetic induction of the second core to drive the LEDs to emit light. In the meantime, the regulation coil forms a regulation voltage through the magnetic induction of the second core. After the detection element 2312 receives the regulation voltage and detects and forms a regulation signal, the regulation voltage and regulation signal are fed back to the regulation chip 2310, and the regulation chip 2310 regulates the working period of the regulation switch 2311 and corrects the primary side coil to receive the cycle time of the operating voltage, so as to affect the magnitude of the driving voltage formed by the magnetic induction of the secondary side coil and achieve the effect of stabilizing the voltage ($V_{LED}$) or current ($I_{LED}$) received by the LEDs to drop the amplitude of ripples by 1.1 times.

What is claimed is:

1. A flicker-free dimming circuit for a non-point light source, comprising an input module, a conversion module and an output module, and the input module being electrically coupled to an external power supply and provided for outputting an input voltage, and the conversion module being electrically coupled to the input module and the output module and provided for outputting an operating voltage to the output module after receiving an input current, and the output module outputting a driving voltage to drive at least one lamp with a wide light source area to operate, characterized in that the flicker-free dimming circuit for a non-point light source comprises a TRIAC module for regulating a conduction phase angle of the input voltage, and the conversion module adopts a boost circuit structure and has a conversion coil and a converter, and the conversion coil and the converter are provided for increasing a voltage value of the input voltage to a voltage value of the operating voltage, and the output module adopts a fly-back circuit structure and has a control coil module and a regulator, and the control coil module is provided for sensing the operating voltage to form the driving voltage while the regulator regulates a working period of the driving voltage to achieve a constant voltage value, wherein the operating voltage has a voltage value of 220 volts, the converter has a sensing coil, a first core, a conversion chip, and a conversion switch, and the conversion coil is installed at a primary side of the first core, and the sensing coil is installed at a secondary side of the first core and electrically coupled to the conversion chip, and the conversion switch is electrically coupled to the conversion chip and the conversion coil, and when the conversion coil transmits the input voltage, the sensing coil forms a sensing voltage through the first core, and the sensing voltage is provided for the conversion chip for reference and then regulate a working period of the conversion switch to maintain the voltage value of the input voltage constant.

2. The flicker-free dimming circuit for a non-point light source according to claim 1, wherein the control coil module comprises a primary side coil, a second core, a secondary side coil and a regulation coil, and the primary side coil and the regulation coil are installed at a primary side of the second core, and the secondary side coil is installed at a secondary side of the second core, and the regulator is electrically coupled to the primary side coil and the regulation coil, and the primary side coil is electrically coupled to the conversion module for receiving the operating voltage, and the secondary side coil forms the driving voltage through magnetic induction of the second core, meanwhile the regulation coil forms a regulation signal through magnetic induction of the second core, and the regulation signal is provided for the regulator to regulate a working period of the primary side coil.

3. The flicker-free dimming circuit for a non-point light source according to claim 2, wherein the regulator has a regulation chip, a regulation switch, and a detection element, and the detection element is electrically coupled to the regulation coil and the regulation chip, and the regulation switch is electrically coupled to the regulation chip and the primary side coil, and when a regulation voltage is obtained from the operating voltage of the magnetic induction of the regulation coil, the detection element detects and forms a regulation signal and feeds back the regulation signal to the regulation chip, so that the regulation chip regulates a working period of the regulation switch to regulate a cycle time of the operating voltage received by the primary side coil, so as to achieve a constant voltage effect.

* * * * *